Figure 1:
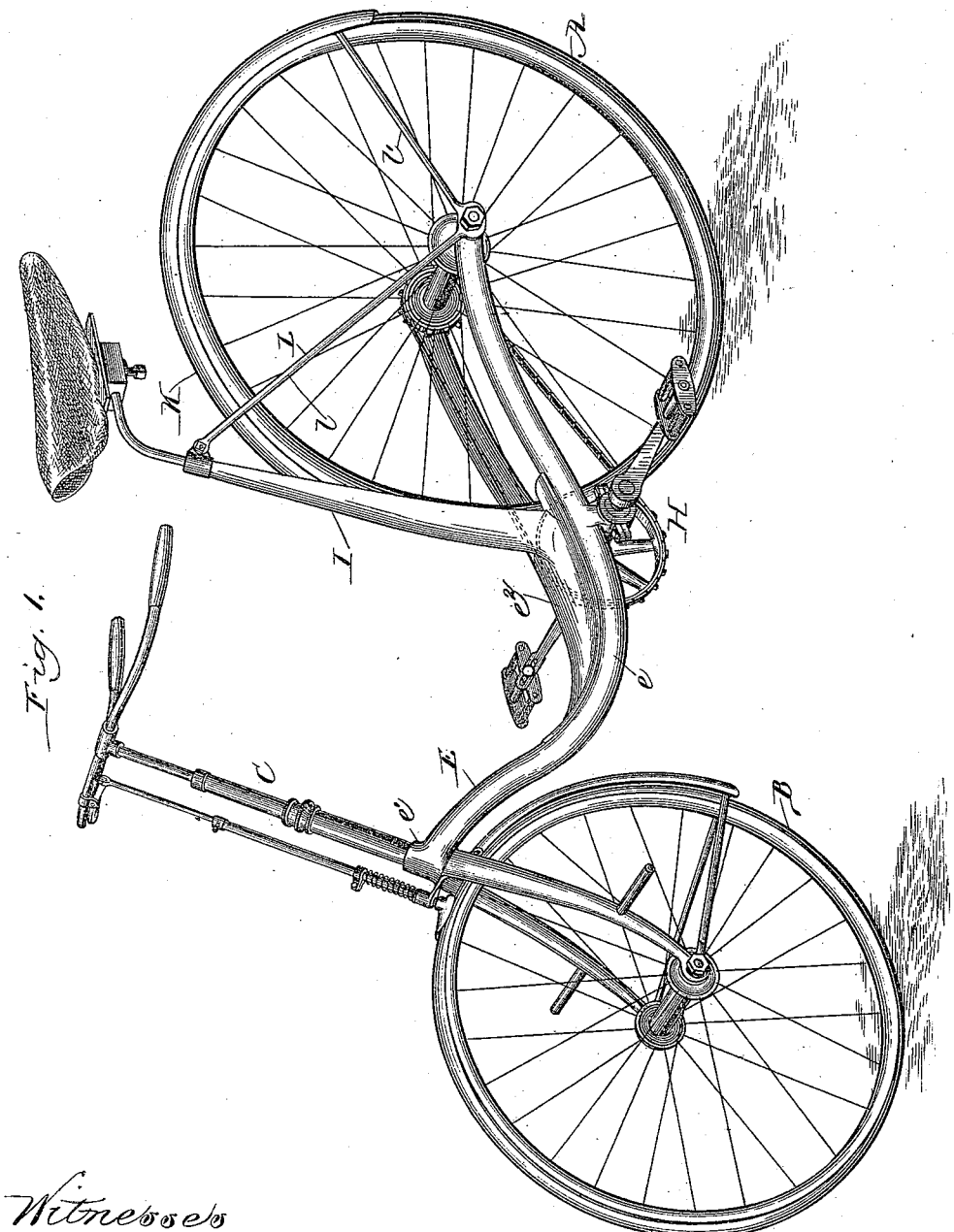

(No Model.)   W. J. EDWARDS.  3 Sheets—Sheet 1.
SAFETY BICYCLE.

No. 442,871.   Patented Dec. 16, 1890.

Witnesses
W. Rossiter
Fred. N. Wies.

Inventor
William J. Edwards
By Chas. G. Page
Atty.

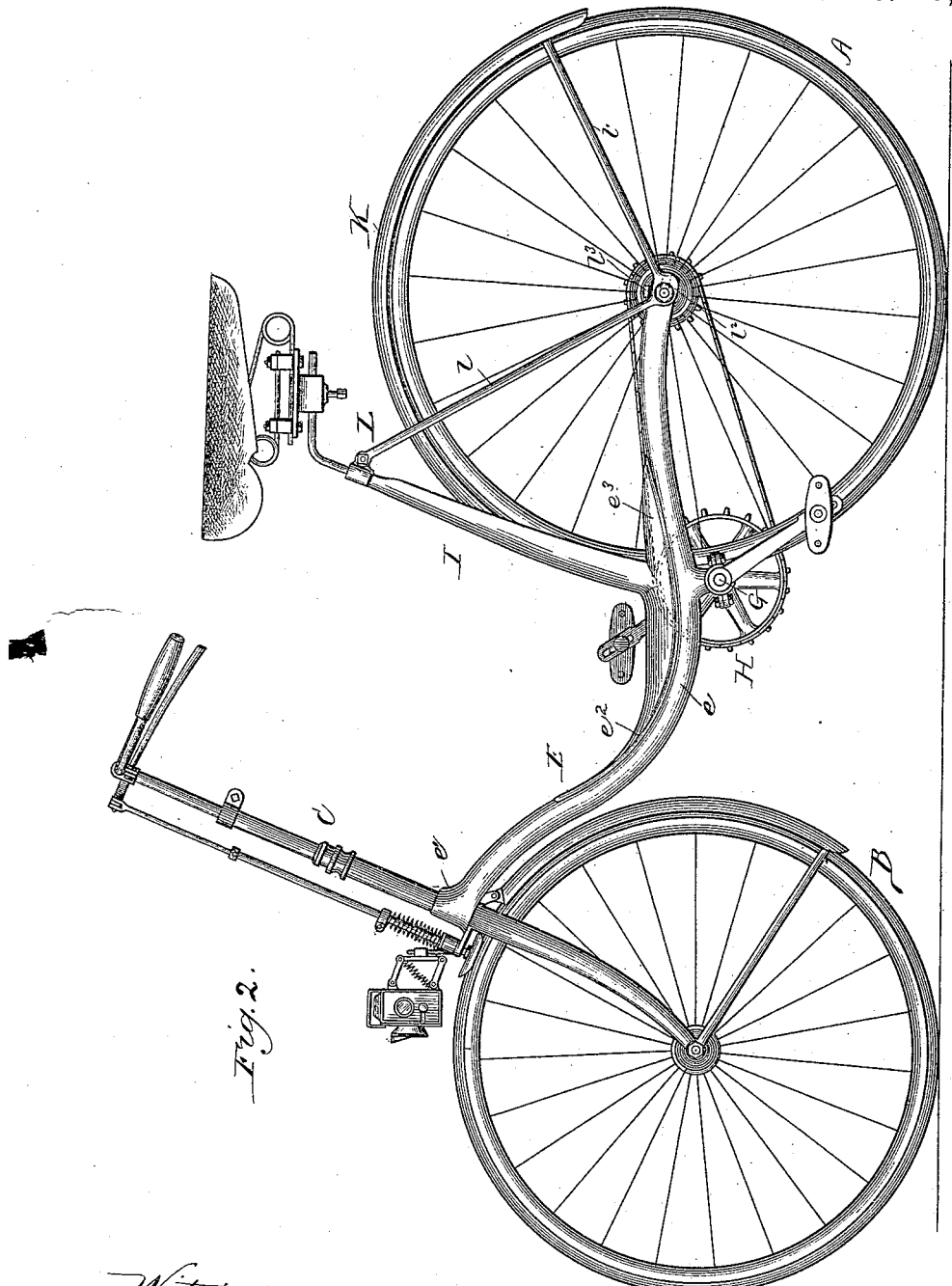

(No Model.) 3 Sheets—Sheet 3.
W. J. EDWARDS.
SAFETY BICYCLE.
No. 442,871. Patented Dec. 16, 1890.
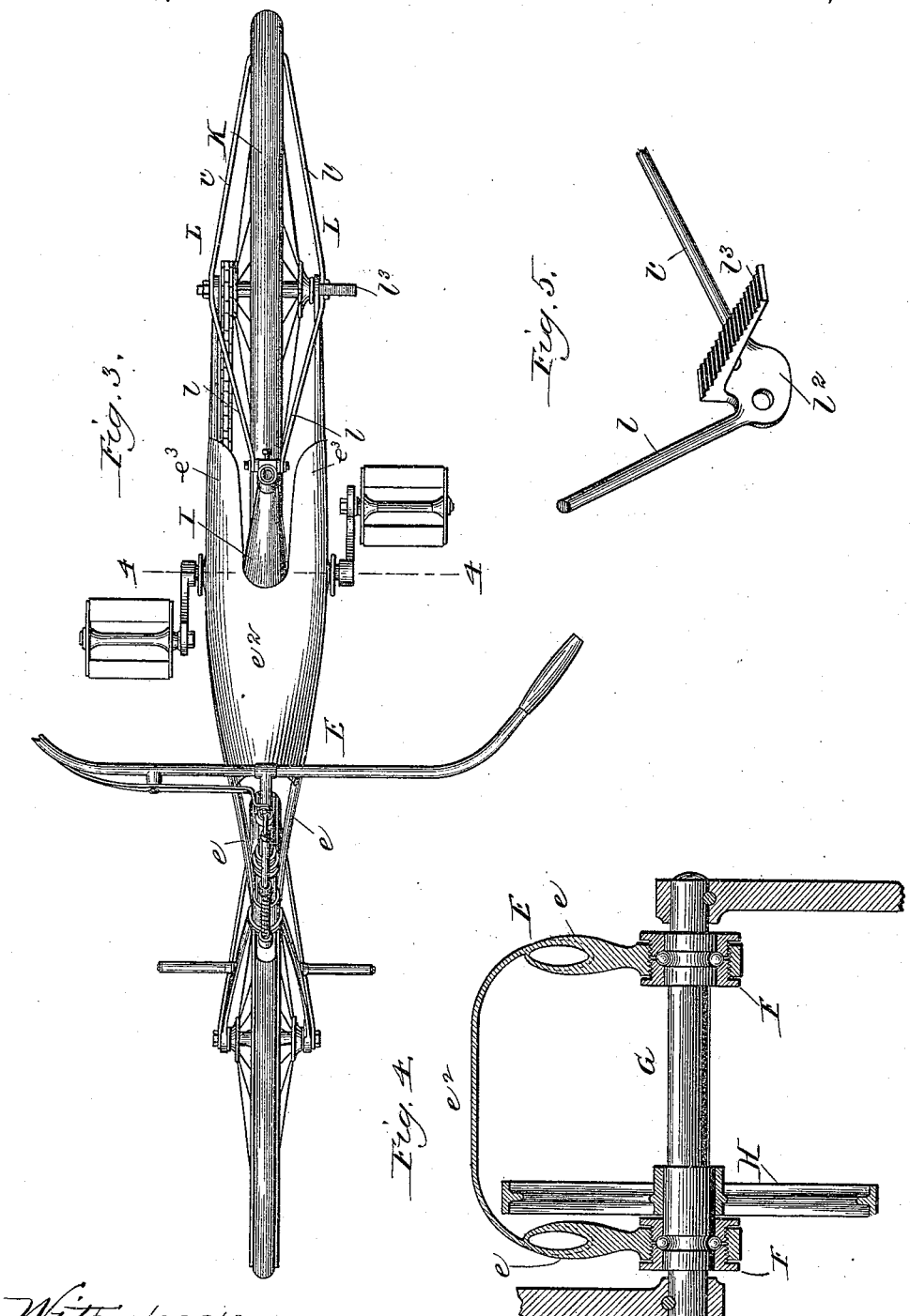

UNITED STATES PATENT OFFICE.

WILLIAM J. EDWARDS, OF CHICAGO, ILLINOIS.

SAFETY BICYCLE.

SPECIFICATION forming part of Letters Patent No. 442,871, dated December 16, 1890.

Application filed October 18, 1889. Serial No. 327,477. (No model.)

*To all whom it may concern:*

Be it known that I, WILLIAM J. EDWARDS, a citizen of the United States, residing at Chicago, in the county of Cook and State of Illinois, have invented a certain new and useful Improvement in Safety Bicycles, of which the following is a specification.

The object of my invention, generally stated, is to provide a light, strong, durable, economical, and exceedingly convenient construction of Safety bicycle adapted in all particulars to serve as a bicycle for ladies' use, and at the same time adapted to serve as a desirable bicycle for male riders.

In a Safety bicycle characterized by my invention the following prominent features of improvement may be here noted, as follows: The low-down reach extends from the steering-post to the rear axle and is widened and arched transversely along its middle portion, thereby attaining great strength with comparative lightness. The chain sprocket which is held on the treadle-axle is set within the arch of the axle, so that it will be covered, in which way all danger of a lady's dress becoming caught by the sprocket will be avoided. As a further improvement, the arched portion of the reach is mainly attained by the employment of an arched sheet-metal plate, which is applied to cover a portion of the space between the side bars of the reach. Said metal plate, which covers the driving-sprocket, is also extended rearwardly over so much of the chain as it may be desired to cover. The seat-standard rises from the reach and is made of sheet metal bent to form a standard curved in cross-section. Said standard is thereby light and strong, and it is arranged so as to form a guard in front of the rear wheel. I also provide braces, which consist each of a single rod bent to form two arms, one of which connects with the seat-standard and the other with a guard over the wheel, while at its middle the rod is secured to the reach. The rod is also provided between its ends with a lip, which is bent to form a step integral with the rod.

In the accompanying drawings, Figure 1 represents in perspective a Safety bicycle embodying my invention. Fig. 2 represents the same in side elevation. Fig. 3 is a top plan view. Fig. 4 is a cross-section on a somewhat larger scale, line 4 4 in Fig. 3. Fig. 5 shows a portion of one of the brace-rods with the step made integral therewith.

The bicycle herein shown comprises, as usual, the rear driving-wheel A, the front wheel B, a steering-post C, and certain auxiliaries which are commonly found in Safety bicycles, and which need not, therefore, be herein particularly described.

E indicates the reach or backbone, which extends continuously from the steering-post to the rear axle. The reach comprises in its construction a pair of side bars $e$, which at their forward ends can either unite with or meet to form a hub or bearing $e'$ for the steering-post. The side bars $e$ of the reach diverge rearwardly from their forward ends, so as to widen the reach along its middle portion and permit its said side bars to extend, respectively, along opposite sides of the rear wheel and connect with its axle thereof, as best illustrated in Fig. 3. The side bars $e$ of the reach are provided with bearings F (see Fig. 4) for the treadle-spindle G, and are bowed outwardly along their forward portions so as to separate them along the middle portion of the reach to an extent to permit the arrangement of the chain sprocket H between them and insure a proper separation of the bearings F for the spindle, which carries both the said chain sprocket and the treadles. The reach is arched in cross-section along its middle portion, as best shown in Fig. 4, and the chain sprocket H, which is fixed on the axle G at a point between the axle-bearings F, is arranged within the arched reach, which covers both the upper portion of the sprocket and a considerable portion of the driving-chain, which serves to connect the sprocket H with a sprocket on the rear axle. The arched form of reach involves great strength and at the same time is comparatively light, and by thus arranging the sprocket H all danger of the dress of a lady rider being caught by either the sprocket or the chain is entirely avoided. As a matter of further improvement, I construct the reach with a longitudinally-extending sheet-metal cover-plate $e^2$, which is arched in cross-section and so shaped that it can be united along its longitudinal edges (by brazing or otherwise) with the side bars $e$ of the reach. This plate is preferably of steel, and when united with the side bars provides the reach with an arched guard portion which covers the sprocket H. The plate $e'$ is also divided and extended along its rear end so that its two extended portions $e^3$ shall respectively extend along opposite sides of the rear wheel as far as it may be desirable for one of said portions to cover the chain. It will be seen that to cover the chain but one of these extended portions $e^3$ of the plate is necessary, but that for appearance and greater strength the plate is provided with two of such extended portions. A steel plate thus arranged is exceedingly strong, and I find in practice that with the reach thus constructed the weight of several exceedingly heavy persons standing upon it will make no impression whatsoever. Broadly considered, the middle portion of the reach is arched and covers the sprocket H, while as a further matter of improvement the arched reach involves the side bars $e$ and an arched guard-plate, which not only strengthens the reach and covers the sprocket, but which is also extended back so as to provide a guard over the chains.

The seat-standard I rises from and is united to the arched reach. Said seat-standard is made curved in cross-section, thereby providing a strong and comparatively light standard. This seat-standard rises from the reach at a point in front of the wheel, and preferably inclines somewhat rearwardly. By forming said standard of a suitable width of sheet-steel or other suitable metal and arranging it just in front of the rear wheel it serves as a mud-guard, which will protect the rider from dirt thrown forward from the wheel. The upper portion of the wheel is covered as usual by a guard K, which said guard can extend forward as far as may be desired. The seat-standard can be secured in various ways to the reach; but as a neat, simple, and durable mode of securement it can be brazed to the plate $e^2$.

The seat-standard I is braced by a couple of double-armed brace-rods L, which extend from the upper portion of the standard downwardly to the rear axle, as at $l$, and thence upwardly to the rear end portion of the guard K, as at $l'$. Each brace L, comprising an arm $l$ and an arm $l'$, is a single rod made continuous from the forward end of arm $l$ to the rear end of arm $l'$, and provided between said ends with an enlarged flattened portion $l^2$, Fig. 5, which is secured by screws or bolts to the rear end of one of the divisions or side bars $e$ of the reach. As a further feature of improvement in this connection, I form each of the rods L not only with a flat lip $l^2$, which can be secured against the reach, but also with an oppositely-extending lip so shaped that when bent at right angles to the plane of the lip $l^2$ it will form a step $l^3$, integral with the brace-rod.

As a preferred way of forming the side bars $e$ of the reach, I construct them of tubular bars somewhat flattened, as in Fig. 4, and at the points where ball-bearing are to be provided for the axle G, I provide said bars with downwardly-extending ears, which can be provided with openings suitable for such bearings; but for the broader purposes of my invention, however, I do not confine myself to such form of side bars, since round hollow bars could be employed.

What I claim as my invention is—

1. The combination and arrangement, substantially as hereinbefore set forth, in a Safety bicycle, of the low-down reach, affording a support for the seat-standard and depressed between the rear driving-wheel and the forward steering-wheel, so as to adapt the machine as a "lady's Safety" bicycle, and having its depressed portion arched in cross-section and widened so as to form a cover for the driving-sprocket and the driving-chain, the driving-sprocket mounted within the arched space of the reach, and the driving-chain arranged to travel within said space, said sprocket and chain being covered by said transversely-arched reach, so as to protect the dress of the rider from entanglement therewith.

2. In a Safety bicycle, the reach comprising a pair of side bars arranged to extend from the steering-post to the rear axle, and a longitudinally-extending arched sheet-metal cover-plate applied to cover a portion of the space between said bars and arranged between the front and rear wheels.

3. In a Safety bicycle, the reach comprising a set of side bars which extend rearwardly respectively along opposite sides of the rear wheel, the driving-sprocket arranged between said side bars, and a guard-plate applied to the side bars so as to cover the sprocket and extended rearwardly over the driving-chain.

4. In a Safety bicycle, the combination and arrangement of the reach comprising a pair of side bars $e$ and a longitudinally-extending cover-plate $e^2$, applied to cover a portion of the space between said bars, the treadle-axle having its bearings applied to the side bars of the reach, and the chain sprocket held on said axle at a point below the plate and between the side bars.

5. In a Safety bicycle, a single brace-rod L, bent to form arms $l$ and $l'$, respectively, connected with the seat-standard and rear wheel-guard and at the point whereat it is so bent provided with an enlarged portion $l^2$, which is secured to the reach, and a lip which is integral with the rod and bent to form a step $l^3$, substantially as set forth.

WILLIAM J. EDWARDS.

Witnesses:
CHAS. G. PAGE,
ANNIE L. COATES.